July 29, 1947.    G. W. BRADY    2,424,875
REINFORCED PROPELLER BLADE
Filed Dec. 9, 1943
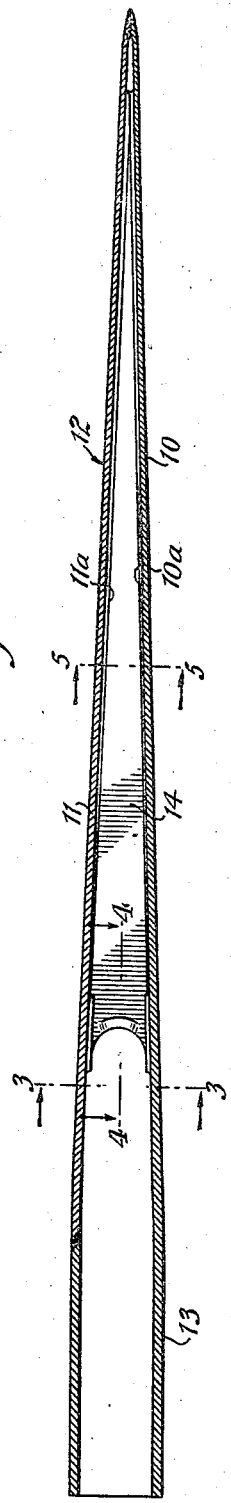
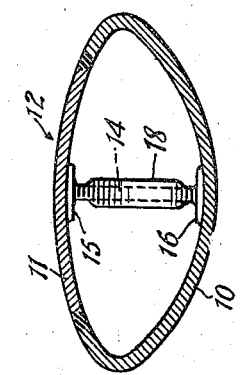
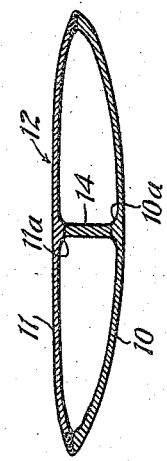
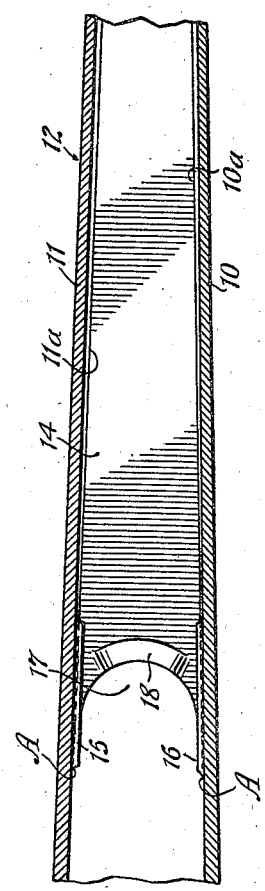
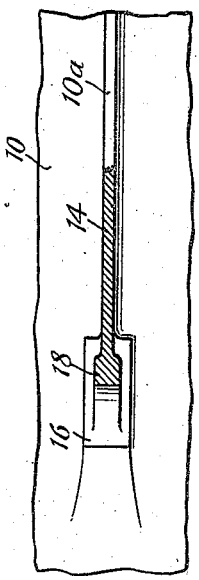
INVENTOR
George W. Brady
BY
ATTORNEY Patented July 29, 1947

2,424,875

UNITED STATES PATENT OFFICE 2,424,875

REINFORCED PROPELLER BLADE

George W. Brady, Upper Montclair, N. J., assignor to Curtiss-Wright Corporation, a corporation of Delaware Application December 9, 1943, Serial No. 513,574

3 Claims. (Cl. 170—159)

1

This invention relates to aircraft propeller blades and more particularly to hollow propeller blades which are internally reinforced.

The invention has particular reference to a hollow blade formed from plates disposed in facing relation and forming an interior chamber, each plate including a longitudinally extending rib formed integrally therewith, the ribs facing each other and being used for reinforcing purposes as hereinafter described.

The invention has further reference to a propeller blade, as specified, wherein a tapered connecting member bridges the space between and is connected to the aforesaid ribs.

The principal object of the invention is to provide a hollow, reinforced propeller blade wherein points of weakness in either of the plates, forming the blade, are obviated.

A further object of the invention is to provide a propeller blade, as specified, wherein a point of weakness in the rib connecting member per se, is eliminated.

Another object of the invention is to provide a propeller blade, as specified, wherein the plates forming the blade are strengthened in regions where one end of an internal reinforcing member terminates.

A further object of the invention is to provide a propeller blade, as specified, wherein an internal bridging member is itself reinforced at one end thereof.

Various other objects, advantages and features of my invention will become apparent from the following detailed description.

My invention resides in the reinforced hollow propeller blade, combinations and arrangements of the character hereinafter described and claimed.

For an understanding of the invention and for an illustration of one of the forms thereof, reference is to be had to the accompanying drawings, in which:

Figure 1 is a longitudinal, vertical sectional view showing a hollow propeller blade as constructed in accordance with my invention;

Fig. 2 is an enlarged, longitudinal, vertical sectional view similar to Fig. 1;

Fig. 3 is a sectional view taken on the line 3—3 of Fig. 1;

Fig. 4 is a similar view taken on the line 4—4 of Fig. 1; and

Fig. 5 is a fragmentary section taken on the line 5—5 of Fig. 1.

Referring to Figs. 1 through 4, I have shown a metallic camber plate 10 and a metallic thrust plate 11 of the general character known in the art for forming a hollow propeller blade 12. As illustrated, the camber plate 10 comprises a tubular shank 13 with the plate proper extending therefrom and generally of convex configuration, the convexity of said plate decreasing in a progressive manner as the end thereof is approached whereby the camber plate 10 defines a shallow opening of generally elliptical configuration.

The thrust plate 11 comprises a plate proper which generally is also of elliptical configuration to correspond with the aforesaid shallow opening of the camber plate 10 and, to less extent than the latter, it is convex in shape. As will be noted in Fig. 1, the thrust plate 11 does not include a shank section as does the camber plate 10.

As illustrated, the plates 10 and 11, include the respective longitudinally extending integral ribs 10a and 11a which, when said plates are assembled, are disposed substantially in facing relation or in a common plane.

As herein shown, although not necessarily, the ribs 10a and 11a are formed, as described in pending application Serial No. 493,314, filed July 2, 1943, by subjecting uniformly thick plane sheets of metal, which form the blank plates for the respective camber and thrust plates 10 and 11, herein disclosed, to two or more milling operations, whereby each sheet of metal is longitudinally tapered in such manner that the thickness thereof decreases longitudinally toward the tip of the blade 12.

In the said tapering operation, longitudinal strips of the original sheets of metal remain intact, these strips of metal forming the respective ribs 10a and 11a, the ends thereof, toward the left, terminating approximately at the respective locations A, indicated in Fig. 2. Moreover, the thickness or height of each of the ribs 10a or 11a increases progressively in a direction extending longitudinally along the propeller blade 12 toward the tip thereof.

In accordance with the present invention, the aforesaid milling operation is carried out in a manner whereby the ribs 10a and 11a at the ends, toward the left, widen or spread out into the respective rectangular reinforcing pads 15 and 16 whereby to increase the thickness of the plates 10 and 11 for a purpose hereinafter to be described.

After the blank plates have been milled, the camber plate 10 and the thrust plate 11 are brought to the finished form by subjecting each of them to the final milling operation, and then trimming and shaping operations, the convex configuration and the twist being imparted thereto during the operation last noted, all as generally referred to in said pending application.

As known in the art and as disclosed in pending application, Serial No. 496,232, filed July 26, 1943, which was issued on August 27, 1946, as Patent Number 2,406,471, a connecting or reinforcing metallic member of tapering configuration spans the space between the facing surfaces of the ribs 10a and 11a when the two plates 10 and 11 are assembled in blade-forming relation. With respect to this connecting member and as described in the last noted application, the wide end thereof is provided with a tapering recess 17 having substantially greater length than width to produce a more flexible joint between the propeller-forming plates 10 and 11. A tapered recess of this character is objectionable by reason of the fact that, under some circumstances, it causes or contributes to fracture of the connecting member in the area thereof adjacent the inner recess end.

It is a feature of the invention that I reinforce the plates 10 and 11 by providing a connecting member 14 which spans the space between the ribs 10a, 11a and which is welded or otherwise suitably secured thereto. At its wide end, the connecting member 14 is provided with a recess 17 which, in configuration, is approximately that of a half circle in contradistinction to the lengthy tapered recess of the prior art. It follows, therefore, that the depth of said recess 17 is preferably although not necessarily equal to the width thereof and the edge area thereof, defining said recess 17, is thickened or enlarged to form reinforcing webs or rims 18 on the respective opposite sides of said connecting member 14.

As will readily be apparent from an inspection of Fig. 2, the connecting member 14 is positioned between and connects the ribs 10a and 11a with the reinforced, recessed end of said connecting member 14 terminating on the pads 15 and 16.

As noted, the recess 17 is flanked by the thickened webs 18 and an arrangement of this character materially decreases the fracture hazard in the connecting member at the recessed end thereof as described above with respect to the prior art. However, with this novel connecting member construction of my invention, dangerous stress concentrations exist in the plates 10 and 11 immediately adjacent the ends of the connecting member 14 and, to overcome this unsatisfactory condition, I provide the pads 15 and 16 which effectively reinforce the respective plates in their otherwise dangerous zones.

By the present invention, then, the pads 15 and 16 prevent undue flexing of the plate members 10 and 11 with the result that there is obtained a more efficient and reliable juncture between the connecting member 14 and said plate members 10, 11.

It shall be understood that my invention is applicable to various forms or types of hollow propeller blades and that it is not to be restricted to a propeller blade formed from two plates. Thus, the "plates" referred to in the claims may be formed from a single piece of material. They need not be separate plates joined together at their edges as illustrated. Alternatively, four or more plates may be utilized to form the propeller blade.

It shall be understood that my invention, in broad aspects thereof, is applicable to propeller blades wherein the member 14 is formed integrally with one, both or all of the blade-forming plates.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a propeller, a pair of plates disposed in facing relation to form a propeller blade, an integral longitudinally extending rib formed on each of said plates, a tapered connecting member between and joining said ribs, said connecting member having a concavely curved recess formed in the wide end thereof, a section-thickening pad formed on each of said plates bordering and underlying the recessed end of said connecting member, the curved ends of said recess blending into the surfaces of said pads, and a recess-defining edge of said connecting member substantially thicker than the rest of said connecting member.

2. In a hollow propeller blade comprising flattened thrust and camber plates of blade planform constituting an airfoil portion, a cylindrical shank portion, a transition portion blending the shank portion into the airfoil portion and a substantially flat rib bridging said thrust and camber plates and extending longitudinally of the blade from a point near the tip to an inner rib end in said transition portion, those improvements which consist in integral pad portions on the thrust and camber plates in the area underlying and bordering the inner rib ends, the thickness of each plate and pad together being greater than the thickness of the plate surrounding the pads, said rib end being concavely curved, the curve thereof defining cusp portions blending into said pad portions.

3. In a hollow propeller blade comprising flattened thrust and camber plates of blade planform constituting an airfoil portion, a cylindrical shank portion, a transition portion blending the shank portion into the airfoil portion and a substantially flat rib bridging said thrust and camber plates and extending longitudinally of the blade from a point near the tip to an inner rib end in said transition portion, those improvements which consist in integral pad portions on the thrust and camber plates in the area underlying and bordering the inner rib ends, the thickness of each plate and pad together being greater than the thickness of the plate surrounding the pads, said rib end being concavely curved, the curve thereof defining cusp portions blending into said pad portions, and sections on the central portion of the concavely curved rib end which are materially thicker than the rib proper, the thickened section being symmetrical on both sides of the rib plane.

GEORGE W. BRADY.

REFERENCES CITED

The following references are of record in the file of this patent:

UNITED STATES PATENTS

| Number | Name | Date |
| --- | --- | --- |
| 2,231,888 | Couch | Feb. 18, 1941 |
| 2,214,339 | McKee | Sept. 10, 1940 |
| 1,461,866 | Dornier | July 17, 1923 |
| 1,558,942 | Stout | Oct. 27, 1925 |
| 1,994,716 | Klemperer | Mar. 19, 1935 |
| 2,170,458 | Moechel | Aug. 22, 1939 |
| 2,097,597 | Pavlecka | Nov. 2, 1937 |